United States Patent
Podal et al.

(10) Patent No.: US 10,929,237 B2
(45) Date of Patent: Feb. 23, 2021

(54) ERROR HANDLING TOOL

(71) Applicant: Bank of America Corporation, Charlotte, NC (US)

(72) Inventors: Savitri Jaganath Podal, Mumbai (IN); Jyotiranjan Mohapatra, Hyderabad (IN); Vishal Patangia, West Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 16/253,405

(22) Filed: Jan. 22, 2019

(65) Prior Publication Data

US 2020/0233749 A1 Jul. 23, 2020

(51) Int. Cl.
*G06F 11/00* (2006.01)
*G06F 11/14* (2006.01)

(52) U.S. Cl.
CPC .... *G06F 11/1443* (2013.01); *G06F 2201/805* (2013.01)

(58) Field of Classification Search
CPC ............. G06F 11/1443; G06F 11/0709; G06F 11/3006; G06F 2201/805
See application file for complete search history.

(56) References Cited

U.S. PATENT DOCUMENTS

| 5,794,005 | A | 8/1998 | Steinman |
| 6,324,495 | B1 | 11/2001 | Steinman |
| 7,454,457 | B1 | 11/2008 | Lowery et al. |
| 8,296,396 | B2 * | 10/2012 | Farber ................. H04L 67/2804 709/219 |
| 8,296,451 | B2 | 10/2012 | Lowery et al. |
| 8,725,836 | B2 | 5/2014 | Lowery et al. |
| 10,592,322 | B1 * | 3/2020 | Seshadri ............. G06F 11/0745 |
| 2015/0324259 | A1 * | 11/2015 | Bastawala ........... G06F 11/2046 714/4.11 |
| 2016/0307264 | A1 * | 10/2016 | Chen ................... G06Q 30/0635 |
| 2020/0076902 | A1 * | 3/2020 | Huang .................. H04L 63/104 |

* cited by examiner

*Primary Examiner* — Joseph D Manoskey
(74) *Attorney, Agent, or Firm* — Michael A. Springs

(57) ABSTRACT

An apparatus includes a memory and a hardware processor. The memory stores a plurality of reprocessing rules. The processor receives a request message from a user device. The processor communicates a second request to a first resource and a third request to a second resource. The processor determines that a response to the second request was not received. The processor increases the first timeout. The processor communicates the second request to the first resource after increasing the first timeout, receives a response to the second request, and determines that a response to the third request was not received. The processor increases the reconnect parameter. The processor communicates the third request to the second resource after increasing the reconnect parameter, receives a response to the third request, generates a response message to the request message, and communicates the response message.

20 Claims, 4 Drawing Sheets

ERROR HANDLING TOOL

TECHNICAL FIELD

This disclosure relates generally to error handling.

BACKGROUND

Computers and mobile devices, such as smartphones, are increasingly used to interact with servers and other online resources.

SUMMARY OF THE DISCLOSURE

Computers and mobile devices, such as smartphones, are increasingly used to interact with servers and other online resources. These computers and mobile devices may communicate requests to servers and other resources. The servers and other resources then perform various functions (e.g., retrieving, calculating, storing, etc.) and send results back to the computers and mobile devices for a user to view. For example, a computer or mobile device may interact with servers and other resources to check accounts, deposit and withdraw funds, make orders and purchases, view media content, etc. Typically, these requests are referred to as "online synchronous calls" and are time limited. In other words, if the servers or resources do not respond to a request within a certain time limit (also referred to as a timeout period), then the request times out and fails. When a request fails, a conventional way of handling the failure is to have the computer or mobile device reissue the request.

In many instances, a request calls on the functions of multiple servers and resources. For example, a request may need to send several component requests to a file system, database, server, and/or application programming interface. The results from each component request can be assembled to form a response to the request. In these instances, if one of the servers or resources fails (e.g., because the resource is not available or is overloaded), then the whole request fails. Even though other resources and servers successfully returned results, the request may nevertheless be reissued, thus causing these servers and resources to redo the work that was previously done. As the number of computers and mobile devices grows, it becomes increasingly infeasible for the servers and resources to redo work.

This disclosure contemplates an error handling tool that reissues component requests when they fail. The error handling tool can use machine learning to update rules that allow the tool to quickly detect and address failures, so that component requests can be fulfilled before the timeout on the user request expires. In this manner, an entire request does not need to be reissued when a component request fails. Additionally, the tool can learn from previous failures and adapt timeouts and failure conditions to reduce the number of failures in the future. Certain embodiments of the error handling tool are described below.

According to an embodiment, an apparatus includes a memory and a hardware processor. The memory stores a plurality of reprocessing rules. The processor receives a request message from a user device. The request message has a request timeout. The processor communicates a first request to a first resource. The processor receives a first response to the first request from the first resource. The processor communicates a second request to the first resource after receiving the first response. The second request has a first timeout that is shorter than the request timeout. The processor communicates a third request to a second resource. The third request has a second timeout that is shorter than the request timeout and a reconnect parameter. The processor communicates a fourth request to a third resource, receives a second response to the fourth request from the third resource, and determines that a response to the second request was not received from the first resource within the first timeout. In response to determining that the response to the second request was not received within the first timeout, the processor increases, based on the plurality of reprocessing rules, the first timeout. The processor communicates the second request to the first resource after increasing the first timeout, receives a third response to the second request from the first resource within the increased first timeout, and determines that a response to the third request was not received from the second resource within the second timeout. In response to determining that the response to the third request was not received from the second resource within the second timeout, the processor increases, based on the plurality of reprocessing rules, the reconnect parameter. The processor communicates the third request to the second resource after increasing the reconnect parameter, receives a fourth response to the third request from the second resource within the second timeout after increasing the reconnect parameter, generates a response message to the request message using the first response, the second response, the third response, and the fourth response, and communicates the response message to the user device within the request timeout.

According to another embodiment, a method includes storing, by a memory, a plurality of reprocessing rules and receiving, by a hardware processor communicatively coupled to the memory, a request message from a user device. The request message has a request timeout. The method includes communicating, by the processor, a first request to a first resource, receiving, by the processor, a first response to the first request from the first resource, and communicating, by the processor, a second request to the first resource after receiving the first response. The second request has a first timeout that is shorter than the request timeout. The method includes communicating, by the processor, a third request to a second resource. The third request has a second timeout that is shorter than the request timeout and a reconnect parameter. The method includes communicating, by the processor, a fourth request to a third resource, receiving, by the processor, a second response to the fourth request from the third resource, and determining, by the processor, that a response to the second request was not received from the first resource within the first timeout. The method includes, in response to determining that the response to the second request was not received within the first timeout, increasing, by the processor, based on the plurality of reprocessing rules, the first timeout, communicating, by the processor, the second request to the first resource after increasing the first timeout, receiving, by the processor, a third response to the second request from the first resource within the increased first timeout, and determining, by the processor, that a response to the third request was not received from the second resource within the second timeout. The method includes, in response to determining that the response to the third request was not received from the second resource within the second timeout, increasing, by the processor, based on the plurality of reprocessing rules, the reconnect parameter, communicating, by the processor, the third request to the second resource after increasing the reconnect parameter, receiving, by the processor, a fourth response to the third request from the second resource within the second timeout after increasing the reconnect parameter, generating, by the processor, a response message to the request message using the first response, the second response, the third response, and the fourth response, and communicating, by the processor, the response message to the user device within the request timeout.

According to yet another embodiment, a system includes a user device, a first resource, a second resource, a third resource, and an error handling tool. The tool stores a plurality of reprocessing rules and receives a request message from the user device. The request message has a request timeout. The tool communicates a first request to the first resource, receives a first response to the first request from the first resource, and communicates a second request to the first resource after receiving the first response. The second request has a first timeout that is shorter than the request timeout. The tool communicates a third request to the second resource. The third request has a second timeout that is shorter than the request timeout and a reconnect parameter. The tool communicates a fourth request to the third resource, receives a second response to the fourth request from the third resource, and determines that a response to the second request was not received from the first resource within the first timeout. In response to determining that the response to the second request was not received within the first timeout, the tool increases, based on the plurality of reprocessing rules, the first timeout. The tool communicates the second request to the first resource after increasing the first timeout, receives a third response to the second request from the first resource within the increased first timeout, and determines that a response to the third request was not received from the second resource within the second timeout. In response to determining that the response to the third request was not received from the second resource within the second timeout, the tool increases, based on the plurality of reprocessing rules, the reconnect parameter. The tool communicates the third request to the second resource after increasing the reconnect parameter, receives a fourth response to the third request from the second resource within the second timeout after increasing the reconnect parameter, generates a response message to the request message using the first response, the second response, the third response, and the fourth response, and communicates the response message to the user device within the request timeout.

Certain embodiments provide one or more technical advantages. For example, an embodiment improves reduces the number of request failures caused by component request failures. As another example, an embodiment reduces the number of request reissues caused by component request failures. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

Computers and mobile devices, such as smartphones, are increasingly used to interact with servers and other online resources. These computers and mobile devices may communicate requests to servers and other resources. The servers and other resources then perform various functions (e.g., retrieving, calculating, storing, etc.) and send results back to the computers and mobile devices for a user to view. For example, a computer or mobile device may interact with servers and other resources to check accounts, deposit and withdraw funds, make orders and purchases, view media content, etc. Typically, these requests are referred to as "online synchronous calls" and are time limited. In other words, if the servers or resources do not respond to a request within a certain time limit (also referred to as a timeout period), then the request times out and fails. When a request fails, a conventional way of handling the failure is to have the computer or mobile device reissue the request.

In many instances, a request calls on the functions of multiple servers and resources. For example, a request may need to send several component requests to a file system, database, server, and/or application programming interface. The results from each component request can be assembled to form a response to the request. In these instances, if one of the servers or resources fails (e.g., because the resource is not available or is overloaded), then the whole request fails. Even though other resources and servers successfully returned results, the request may nevertheless be reissued, thus causing these servers and resources to redo the work that was previously done. As the number of computers and mobile devices grows, it becomes increasingly infeasible for the servers and resources to redo work.

This disclosure contemplates an error handling tool that reissues component requests when they fail. The error handling tool can use machine learning to update rules that allow the tool to quickly detect and address failures, so that component requests can be fulfilled before the timeout on the user request expires. In this manner, an entire request does not need to be reissued when a component request fails. Additionally, the tool can learn from previous failures and adapt timeouts and failure conditions to reduce the number of failures in the future. Certain embodiments of the error handling tool are described below. The system and error handling tool will be described in more detail using FIGS. 1 through 4.

Figure 1:
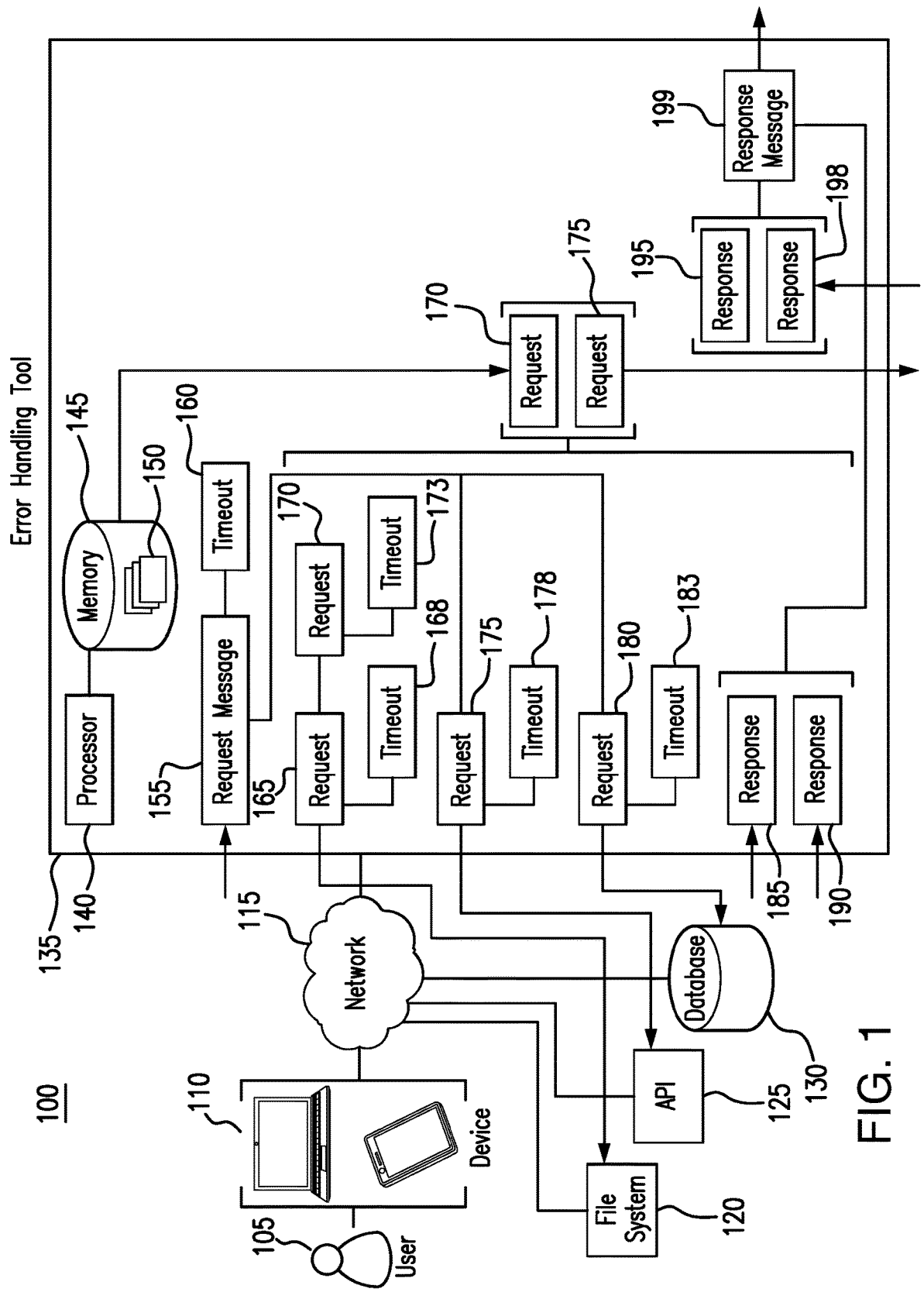
FIG. 1 illustrates an example system.

FIG. 1 illustrates an example system 100. As seen in FIG. 1 system 100 includes a user 105, one or more devices 110, a network 115, a file system 120, an application programming interface 125, a database 130, and an error handling tool 135. Generally, error handling tool 135 reprocesses component requests of a request message without reissuing the entire request message. As a result, one or more resources and/or servers in system 100 are not overburdened with redoing work that was previously done for other component requests in certain embodiments.

User 105 uses one or more devices 110 to communicate requests over network 115. Devices 110 may execute one or more applications to enable user 105 to issue requests to other components of system 100. The requests may ask other components of system 100 to perform certain tasks. The results of these requests are returned to device 110 and presented to user 105. Requests issued by device 110 may be referred to as online synchronous calls. These requests may be time limited, in that the requests are associated with a timeout. If a request is not responded to within the timeout, then the request may fail and/or timeout. Thus, if a component request of a request fails to be responded to within the timeout then an entire request may fail and/or timeout.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, smartphone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes one or more servers and/or resources that perform various functions to respond to requests issued by device 110. This disclosure contemplates any suitable server and/or resource to be used in system 100. In the illustrated example of FIG. 1, system 100 includes a file system 120, an application programming interface 125, and a database 130. Generally, file system 120 can be used to store and/or retrieve files. Application programming interface 125 can be used to make software function calls. Database 130 can be used to store and/or retrieve data. Each of these servers and/or resources can be called upon to fulfill or service various requests or component requests issued by device 110. Each of these resources can respond to these requests after performing a requested function or action. These responses can be aggregated and communicated back to device 110.

A request issued by device 110 may include multiple component requests. Each of these component requests may be communicated to a different resource in system 100. These resources may perform functions requested by these component requests and communicate individual responses to be aggregated. In some instances, one or more resources may not be available or may be unable to complete a component request. In these instances, the entire request may fail even though other resources and/or servers successfully responded to their component request. Typically, device 110 may reissue the entire request when one or more component requests fail. As a result, certain component requests may be reissued, even though a resource and/or server previously responded to these component requests successfully. As a result, these resources and/or servers may be asked to redo or reperform certain functions to respond to the reissued component requests. Redoing these tasks may result in waste of system resources and/or overburdening or overloading of the one or more resources.

Error handling tool 135 may reduce and/or eliminate the need to reissue an entire request when a component request fails. As seen in FIG. 1, error handling tool 135 includes a processor 140 and a memory 145. This disclosure contemplates processor 140 and memory 145 being configured to perform any of the functions of error handling tool 135 described herein. Generally, error handling tool 135 breaks a request into its component requests and then determines whether any component requests fail. Error handling tool 135 then reissues any failed component requests while maintaining the results of successful component requests. Error handling tool 135 may implement machine learning to learn and to adapt to failures to prevent or to reduce the instances of future request failures.

Processor 140 is any electronic circuitry, including, but not limited to microprocessors, application specific integrated circuits (ASIC), application specific instruction set processor (ASIP), and/or state machines, that communicatively couples to memory 145 and controls the operation of error handling tool 135. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of error handling tool 135 by processing information received from devices 110, network 115, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Error handling tool 135 stores a plurality of reprocessing rules 150. Generally reprocessing rules 150 specify the conditions under which certain requests and/or component request fail. Reprocessing rules 150 also indicate the appropriate response to be taken when a certain request or component request fails. In some instances, reprocessing rules 150 also indicate parameters to be set when requests are issued and/or reissued. Error handling tool 135 uses and updates reprocessing rules 150 during the handling of requests and component requests. Error handling tool 135 may refer to one or more reprocessing rules 150 to determine when a request fails and how to handle the failure.

Error handling tool 135 receives a request message 155 from device 110. Request message 155 may indicate one or more operations that have been requested by device 110. Request message 155 has a timeout 160. Timeout 160 indicates a period of time in which request message 155 should be responded to. If request message 155 is not responded to within timeout 160, then request message 155 is considered a failure. Certain examples of request message 155 include balance checks, balance transfers, deposits, withdrawals, purchases, orders, downloads, uploads, viewing media content, etc.

Request message 155 may include one or more component requests. Each component requests may be communicated to a resource within system 100 such as file system 120, application programming interface 125, and/or database 130. A component request may request that a particular resource perform a particular function. Error handling tool 135 may communicate component request in parallel or in sequence. In the example of FIG. 1, request message 155 includes component requests 165, 170, 175, and 180. Error handling tool communicates request 165 and 170 to file system 120 in sequence. Error handling tool 135 communicates request 175 to application programming interface 125 in parallel with request 165 and 180. Error handling tool 135 communicates request 180 to database 130 in parallel with request 165 and request 175. Generally, when two component requests are communicated in sequence then the second request may not be communicated until the first request has been responded to. When two requests are communicated in parallel both requests can be communicated even though neither one has been responded to. File system 120 is expected to respond to request 165 and 170. Application programming interface 125 is expected to respond to request 175. Database 130 is expected to respond to request 180.

Each component request has a timeout in which the component request should be responded to. If the component request is not responded to within that timeout, then the component request is considered a failure. In the illustrated example of FIG. 1, request 175 has a timeout 168, request 170 has a timeout 173, request 175 has a timeout 178, and request 180 has timeout 183. If file system 120 does not respond to request 165 within timeout 168 or request 170 within timeout 173, then request 165 and/or request 170 is considered a failure. If application programming interface 125 does not respond to request 175 within timeout 178, then request 175 is considered a failure. If database 130 does not respond to request 180 within timeout 183, then request 180 is considered a failure. The timeouts of the component requests are typically shorter than timeout 160 of request message 155. At most, the timeouts of the component requests are typically equal to timeout 160.

In some instances, requests and/or component requests may fail for reasons other than a timeout. For example, component requests may fail if a resource has been upgraded to a new version and the component request is not properly structured for the upgraded resource. In these instances, the resource may not understand the component request that was sent, and an error may be thrown.

One or more resources in system 100 handles the component requests that are communicated to these resources. The resources perform functions requested by each component request and communicates responses back to error handling tool 135. In the illustrated example of FIG. 1, error handling tool 135 receives response 185 from file system 120 and response 190 from database 130. Response 185 may be a response received for request 165. Response 190 may be a response for request 180. Responses 185 and 190 are received within timeout 168 and timeout 183. After response 185 is received, error handling tool 135 may communicate request 170 to file system 120. As seen in the example of FIG. 1, error handling tool 135 does not receive responses to request 170 from file system 120 and request 175 from application programming interface 125. In some instances, error handling tool 135 does not receive responses to these requests before their corresponding timeouts expire. In other words, error handling tool 135 may not receive a response for request 170 before timeout 173 expires and error handling tool 135 may not receive a response to request 175 before timeout 178 expires. As a result, error handling tool 135 considers request 170 and request 175 as failures.

In some instances, error handling tool 135 may receive an error that is part of or distinct from a received response. The error may indicate why a certain request and/or component request failed. For example, the error may indicate that the request was not understood by an upgraded resource (e.g., because the request was not properly structured for the upgraded resource).

Error handling tool 135 may use reprocessing rules 150 to determine how to handle request failures. For example, error handling tool 135 may determine that a certain timeout for a component request should be increased to give the request and/or resource more time to respond to the request. As another example, error handling tool 135 may determine that a reconnect parameter should be increased to allow a request to be attempted an increased number of times before the request is considered a failure. As yet another example, error handling tool 135 may determine that a request should be restructured so that an upgraded resource can understand the request. In the illustrated example of FIG. 1, error handling tool 135 determines, based on reprocessing rules 150, that requests 170 and 175 should be reissued to file system 120 and application programming interface 125. Error handling tool 135 may make any adjustments to timeouts, reconnect parameters, and/or request structure when reissuing request 170 and 175. After request 170 and 175 are reissued, error handling tool 135 receives responses 195 and 198. Response 195 may be the response from file system 120 for request 170. Response 198 may be the response from application programming interface 125 to request 175.

Error handling tool 135 aggregates response 185, response 190, response 195, and response 198 to generate response message 199. Response message 199 includes the results for request message 155. Error handling tool 135 communicates response message 199 to device 110. In some embodiments, error handling tool 135 communicates response message 199 to device 110 before timeout 160 expires. In this manner device 110 receives a response to request message 155 within the allotted timeout 160 even though certain component requests of request message 155 failed. Error handling tool 135 provides response message 199 in such a manner that device 110 may not detect that these component requests failed. As a result, device 110 does not need to reissue request message 155 even though certain component requests failed. As a result, system resources are conserved, and certain resources are not tasked with reperforming certain component requests. The operation of error handling tool 135 will be described in more detail using FIGS. 2 through 4.

Figure 2:
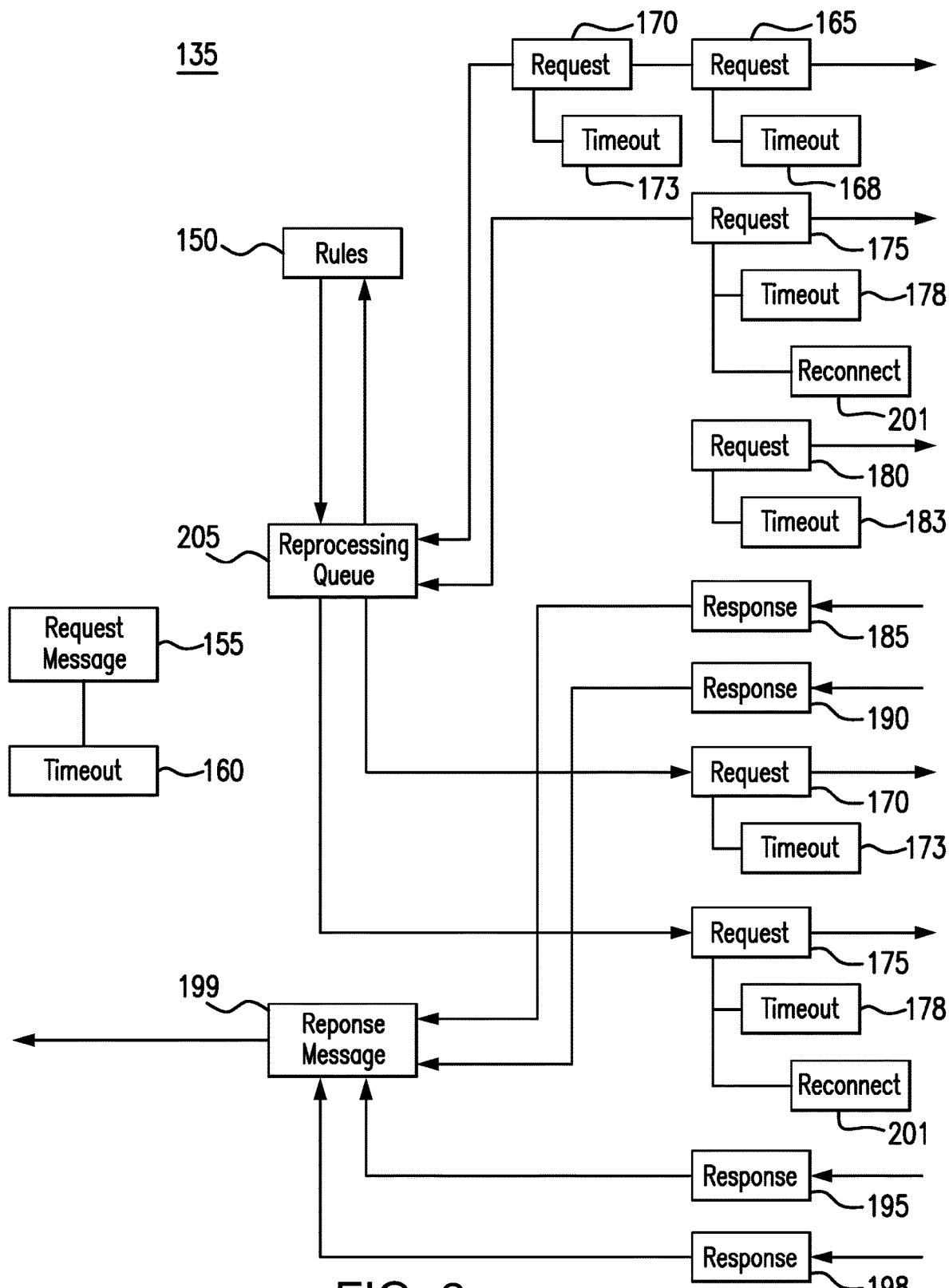
FIG. 2 illustrates an error handling tool of the system of FIG. 1.

FIG. 2 illustrates error handling tool 135 of the system 100 of FIG. 1. Generally, error handling tool 135 reprocesses failed component requests so that a request from a user device does not fail. In certain embodiments, error handling tool 135 reduces the number of reissued requests, thus reducing the load on system resources and/or servers.

Error handling tool 135 receives request message 155 from a user device. Request message 155 may request an operation or a function that has several component requests. Each component request may be directed to a different resource of the system. For example, component requests may be directed towards file systems, application programming interfaces, databases, servers, etc. The success of request message 155 may depend upon the success of each component request. If one component request fails, such as, for example, because a resource, such as a server or database was unavailable, then request message 155 may fail if the failed component request is not handled properly.

Request message 155 has a timeout 160. If a response to a request message 155 is not communicated before timeout 160 expires, then request message 155 is considered a failure. Thus, it is important that each component request of request message 155 communicates a response before the expiration of timeout 160.

Error handling tool 135 communicates request 165 to a resource such as a file system. Request 165 has a timeout 168 that is shorter than timeout 160. The file system receives request 165 and responds to request 165 with response 185 before the expiration of timeout 168. For example, request 165 may request a particular file in the file system and response 185 may include the requested file.

After response 185 is received, error handling tool 135 communicates request 170 to the file system. Request 170 has a timeout 173 that is shorter than timeout 160. The file system may become overloaded and/or unavailable, and so error handling tool 135 may not receive a response to request 170 before timeout 173 expires. When timeout 173 expires, error handling tool 135 determines that request 170 did not receive a response, and so error handling tool 135 determines that request 170 failed. In response to the failure determination, error handling tool 135 places request 170 in reprocessing queue 205.

Error handling tool 135 may use rules 150 to determine whether any parameters for request 170 should be changed before reprocessing request 170. For example, error handling tool 135 may determine that the file system was overburdened and so request 170 may be successful if timeout 173 were increased. In response error handling tool 135 increases timeout 173 before reprocessing request 170. In some embodiments error handling tool 135 may update rules 150 to reflect the increase timeout for requests to the file system. Thus, subsequent requests to the file system may be adjusted to have longer timeouts.

Error handling tool 135 reprocesses requests 170 by communicating request 170 to the file system with an increased timeout 173. Because timeout 173 is increased, the file system has additional time to respond to request 170. As a result, the file system may successfully respond to request 170 and communicate response 195 to error handling tool 135.

Error handling tool 135 communicates request 175 to a resource, such as, for example, an application programming interface. Request 175 may be a function call to the application programming interface. Request 175 has a timeout 178 and a reconnect parameter 201. Timeout 178 is shorter than timeout 160. The application programming interface for a server hosting the application programming interface may have a weak connection. As a result, error handling tool 135 may reconnect several times to the server to process request 175. If error handling tool 135 does not receive a response to request 175 before timeout 178 expires, or if error handling tool 135 does not receive a response to request 175 after a certain number of reconnects indicated by reconnect parameter 201, error handling tool 135 may indicate that request 175 is a failure. In response to determining that request 175 failed, error handling tool 135 places request 175 in reprocessing queue 205.

Error handling tool 135 uses rules 150 to update request 175 before reprocessing request 175. For example, rules 150 may indicate that reconnect parameter 201 should be increased to allow error handling tool 135 to reconnect to the server hosting the application programming interface more times before declaring a failure to account for the weak connection with the server. Accordingly, error handling tool 135 increases reconnect parameter 201 before reprocessing request 175. In some embodiments error handling tool 135 updates rules 150 to indicate the increased reconnect parameter 201 for connections with the server hosting the application programming interface. As a result, future requests to that server may use the increased reconnect parameter 201.

Error handling tool 135 reprocesses request 175 by communicating request 175 to the application programming interface with the increased reconnect parameter 201. Because error handling tool 135 is allowed to reconnect to the server more times before declaring request 175 a failure, request 175 may complete successfully and the server or the application programming interface may communicate response 198 to error handling tool 135.

Error handling tool 135 communicates request 180 to a resource, such as for example, a database. Request 180 has a timeout 183 that is shorter than timeout 160. The database processes request 180 and communicates response 190 to error handling tool 135. Response 190 may include data or information stored in the database that was requested by request 180.

Although the described examples have error handling tool 135 communicating requests to a file system, application programming interface, and database, this disclosure contemplates error handling tool 135 communicating requests to any suitable resource or server. Additionally, this disclosure contemplates any communicated request may succeed or fail even though it is not described as such.

Error handling tool 135 generates response message 199 using response 185, response 190, response 195, and response 198. Response message 199 may be a response to request message 155. Error handling tool 135 communicates response message 199 back to the user device that communicated request message 155 before the expiration of timeout 160. In this manner the user device receives a response to request message 155 before timeout 160 expires. From the perspective of the user device request message 155 was successfully responded to even though component requests of message 155 failed. As a result, the user device does not reissue request message 155, thus reducing the load on the resources and servers in the system.

In certain embodiments, error handling tool 135 communicates component requests in any order. For example, error handling tool 135 may communicate request 165, request 175, and request 180 in parallel because they are communicated to different resources. Error handling tool 135 may communicate request 165 and request 170 in sequence because they are communicated to the same resource. As a result, request 165, request 175, and request 180 are communicated to their respective resources before request 170 is communicated to its respective resource. In this manner, the processing of component requests may be done faster than if all component request were communicated sequentially.

Figure 3:
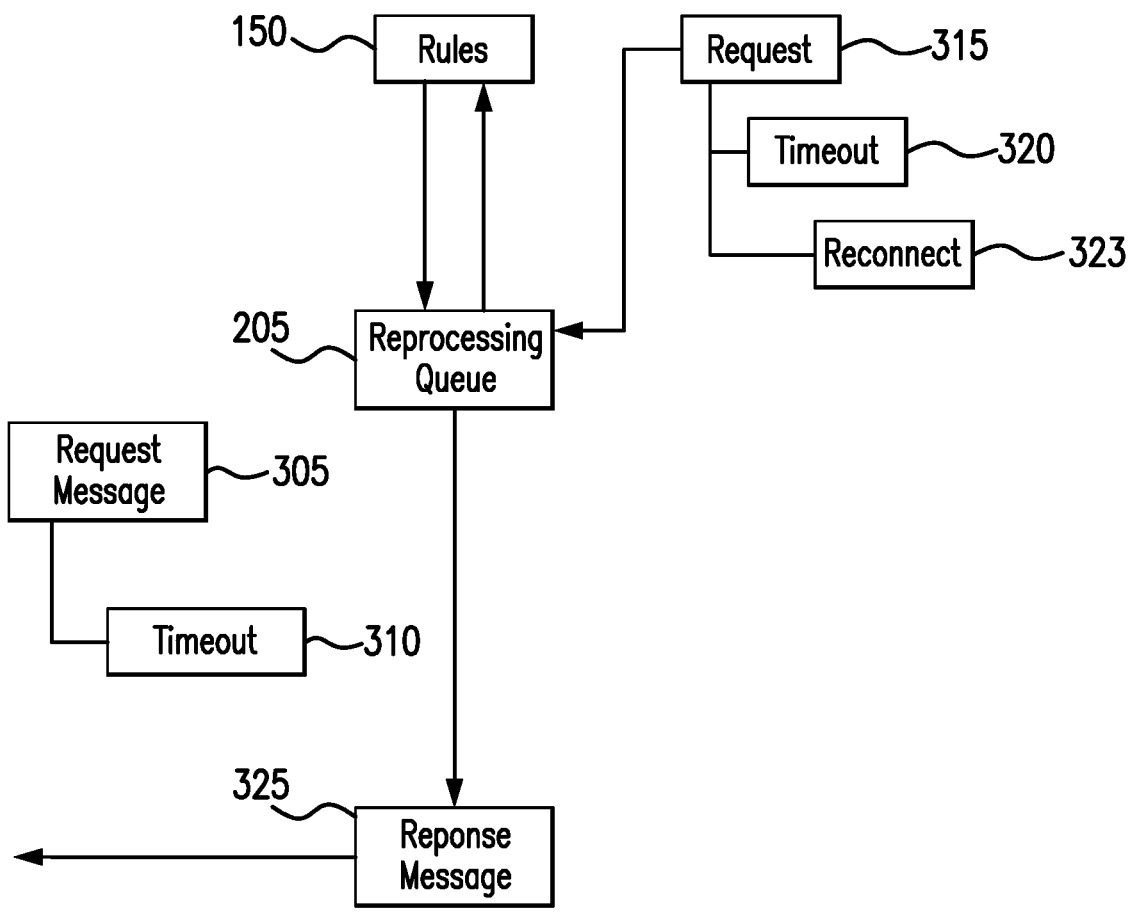
FIG. 3 illustrates an example error handling tool of the system of FIG. 1.

FIG. 3 illustrates an example error handling tool 135 of the system 100 of FIG. 1. Generally, in the example of FIG. 3, a request message fails because a component request fails despite updated parameters based on rules 150.

Error handling tool 135 receives a request message 305 from the user device. Request message 305 has a timeout 310. If a response to request message 305 is not received before timeout 310 expires, then request message 305 is considered a failure.

Error handling tool 135 communicates component request 315 of request message 305 to a resource. Request 315 has a timeout 320 that is shorter than timeout 310, and a reconnect parameter 323. Timeout 320 and reconnect parameter 323 may be increased based on the example of FIG. 2. Error handling tool 135 may not receive a response to request 315 before the expiration of timeout 320 and/or before error handling tool 135 reconnects an excessive number of times to the resource that is processing request 315. In other words, despite the increased timeout 320 and or the increased reconnect parameter 323, request 315 still fails.

In response, error handling tool 135 places request 315 in reprocessing queue 205. Error handling tool 135 may determine based on rules 150 that timeout 320 and/or reconnect parameter 323 may not be increased further. For example, increasing timeout 320 and/or reconnect parameter 323 may cause request 315 to not be responded to before timeout 310 expires.

In response, error handling tool 135 generates response message 325 and communicates response message 325 to the user device. Response message 325 may indicate that request 315 and/or request message 305 failed. In this manner, the user device is alerted that request message 305 should be reissued at a subsequent time to be successful.

Figure 4:
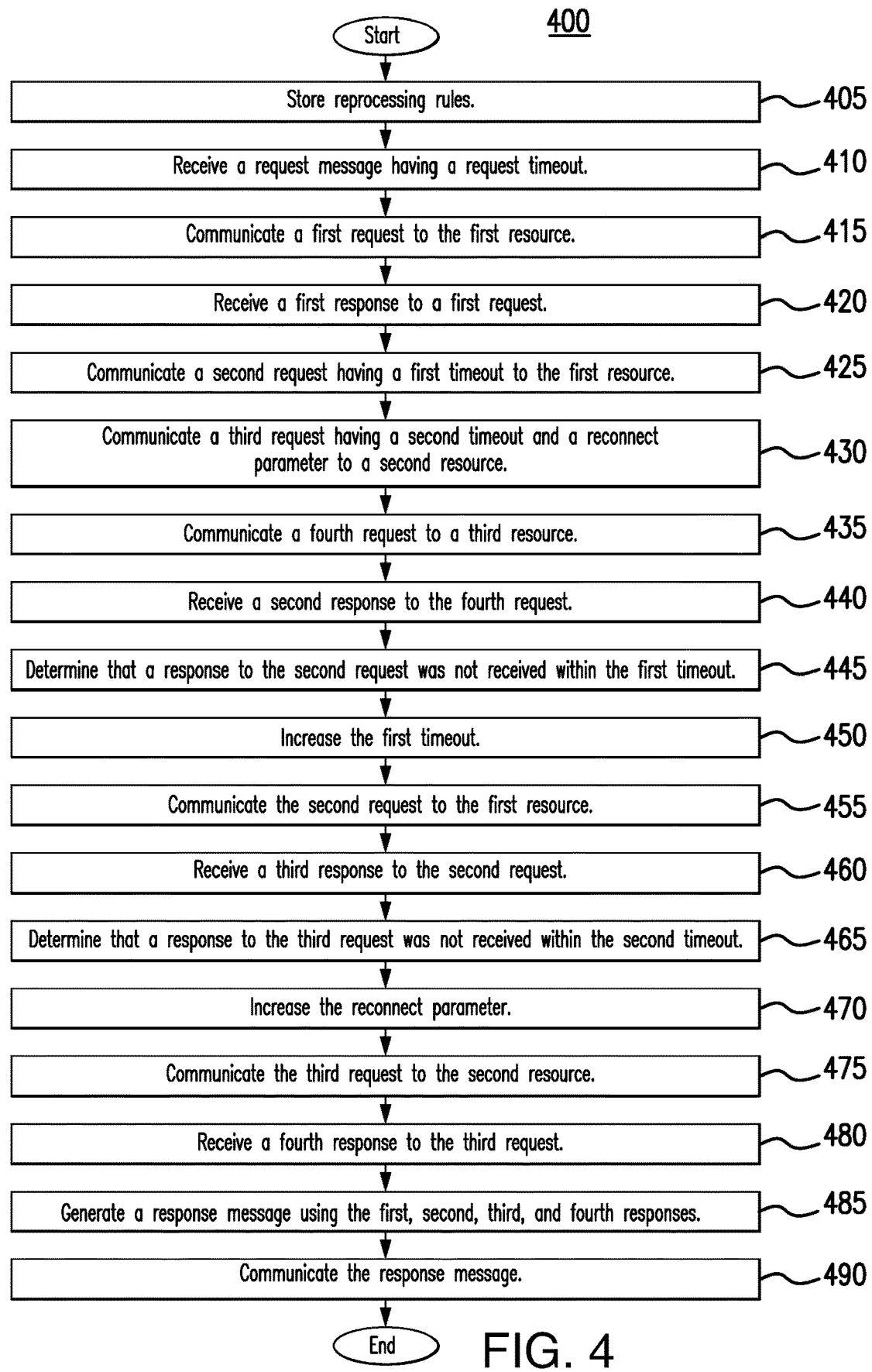
FIG. 4 is a flowchart illustrating a method of operating the error handling tool of the system of FIG. 1.

FIG. 4 is a flow chart illustrating the method 400 of operating the error handling tool 135 of the system 100 of FIG. 1. In particular embodiments, error handling tool 135 performs the steps of method 400. By performing method 400, error handling tool 135 reduces the load on the resources of system 100 by reducing the number of reissued requests.

Error handling tool 135 begins by storing reprocessing rules in step 405. In step 410, error handling tool 135 receives a request message having a request timeout. Error handling tool 135 communicates a first request to a first resource in step 415. In step 420, error handling tool 135 receives a first response to the first request. Error handling tool 135 communicates a second request having a first timeout to the first resource in step 425. In step 430, error handling tool 135 communicates a third request having a second timeout and a reconnect parameter to a second resource. Error handling tool 135 communicates a fourth request to a third resource in step 435. In step 440, error handling tool 135 receives a second response to the forth request.

In step 445, error handling tool 135 determines that a response to the second request was not received within the first timeout. Error handling tool 135 increases the first timeout in step 450. In step 455, error handling tool 135 communicates the second request to the first resource. Error handling tool 135 receives a third response to the second request in step 460.

In step 465, error handling tool 135 determines that a response to the third request was not received within the second timeout. In step 470, error handling tool 135 increases the reconnect parameter. Error handling tool 135 communicates the third request to the second resource in step 475. In step 480, error handling tool 135 receives a fourth response to the third request.

Error handling tool 135 generates a response message using the first, second, third, and fourth responses in step 485. In step 490, error handling tool 135 communicates the response message.

Modifications, additions, or omissions may be made to method 300 depicted in FIG. 4. Method 400 may include more, fewer, or other steps. For example, steps may be performed in parallel or in any suitable order. While discussed as error handling tool 135 performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of reprocessing rules; and
a hardware processor communicatively coupled to the memory, the hardware processor configured to:
receive a request message from a user device, the request message having a request timeout;
determine component requests of the request message comprising a first request, a second request, a third request, and a fourth request, wherein an assembly of responses to each component request form a response to the request message;
communicate the first request to a first resource;
receive a first response to the first request from the first resource;
communicate the second request to the first resource after receiving the first response, the second request having a first timeout that is shorter than the request timeout, wherein the first timeout is set by the user device, and the first request and the second request are communicated to the first resource in sequence;
communicate the third request to a second resource, the third request having a second timeout that is shorter than the request timeout and a reconnect parameter, wherein the reconnect parameter of the third request indicates a number of connection attempts to be made before the third request is considered a failure;
communicate the fourth request to a third resource, wherein the third request and the fourth request are communicated to the second resource and the third resource, respectively in parallel;
receive a second response to the fourth request from the third resource;
determine that a response to the second request was not received from the first resource within the first timeout;
in response to determining that the response to the second request was not received within the first timeout, increase, based on the plurality of reprocessing rules, the first timeout;
communicate the second request to the first resource after increasing the first timeout;
receive a third response to the second request from the first resource within the increased first timeout;
determine that a response to the third request was not received from the second resource within the second timeout;
in response to determining that the response to the third request was not received from the second resource within the second timeout, increase, based on the plurality of reprocessing rules, the reconnect parameter;
communicate the third request to the second resource after increasing the reconnect parameter;
receive a fourth response to the third request from the second resource within the second timeout after increasing the reconnect parameter;
generate a response message to the request message using the first response, the second response, the third response, and the fourth response; and
communicate the response message to the user device within the request timeout.

2. The apparatus of claim 1, wherein the hardware processor communicates the third request to the second resource and the fourth request to the third resource before communicating the second request to the first resource.

3. The apparatus of claim 1, wherein the hardware processor is further configured to adjust the plurality of reprocessing rules based on increasing the first timeout and the reconnect parameter.

4. The apparatus of claim 1, wherein the hardware processor is further configured to:
place the second request in a reprocessing queue after determining that the response to the second request was not received from the first resource within the first timeout; and
place the third request in the reprocessing queue after determining that the response to the third request was not received from the second resource within the second timeout.

5. The apparatus of claim 1, wherein the first resource is a file system, the second resource is an application programming interface, and the third resource is a database.

6. The apparatus of claim 1, wherein the hardware processor is further configured to:
receive a second request message from the user device;
communicate a fifth request to the first resource;
determine that a response to the fifth request was not received from the first resource within the increased first timeout; and
communicate a second response message to the user device indicating that the fifth request timed out.

7. The apparatus of claim 1, wherein the hardware processor is further configured to:
receive a second request message from the user device;
communicate a fifth request to the second resource;
determine that a response to the fifth request was not received from the second resource according to the increased reconnect parameter; and
communicate a second response message to the user device indicating that fifth request failed.

8. A method comprising:
storing, by a memory, a plurality of reprocessing rules;
receiving, by a hardware processor communicatively coupled to the memory, a request message from a user device, the request message having a request timeout;
determining component requests of the request message comprising a first request, a second request, a third request, and a fourth request, wherein an assembly of responses to each component request form a response to the request message;
communicating, by the processor, the first request to a first resource;
receiving, by the processor, a first response to the first request from the first resource;
communicating, by the processor, the second request to the first resource after receiving the first response, the second request having a first timeout that is shorter than the request timeout, wherein the first timeout is set by the user device, and the first request and the second request are communicated to the first resource in sequence;
communicating, by the processor, the third request to a second resource, the third request having a second timeout that is shorter than the request timeout and a reconnect parameter, wherein the reconnect parameter of the third request indicates a number of connection attempts to be made before the third request is considered a failure;
communicating, by the processor, the fourth request to a third resource, wherein the third request and the fourth request are communicated to the second resource and the third resource, respectively in parallel;
receiving, by the processor, a second response to the fourth request from the third resource;
determining, by the processor, that a response to the second request was not received from the first resource within the first timeout;
in response to determining that the response to the second request was not received within the first timeout, increasing, by the processor, based on the plurality of reprocessing rules, the first timeout;
communicating, by the processor, the second request to the first resource after increasing the first timeout;
receiving, by the processor, a third response to the second request from the first resource within the increased first timeout;
determining, by the processor, that a response to the third request was not received from the second resource within the second timeout;
in response to determining that the response to the third request was not received from the second resource within the second timeout, increasing, by the processor, based on the plurality of reprocessing rules, the reconnect parameter;
communicating, by the processor, the third request to the second resource after increasing the reconnect parameter;
receiving, by the processor, a fourth response to the third request from the second resource within the second timeout after increasing the reconnect parameter;
generating, by the processor, a response message to the request message using the first response, the second response, the third response, and the fourth response; and
communicating, by the processor, the response message to the user device within the request timeout.

9. The method of claim 8, wherein communicating the third request to the second resource and the fourth request to the third resource occurs before communicating the second request to the first resource.

10. The method of claim 8, further comprising adjusting, by the processor, the plurality of reprocessing rules based on increasing the first timeout and the reconnect parameter.

11. The method of claim 8, further comprising:
placing, by the processor, the second request in a reprocessing queue after determining that the response to the second request was not received from the first resource within the first timeout; and
placing, by the processor, the third request in the reprocessing queue after determining that the response to the third request was not received from the second resource within the second timeout.

12. The method of claim 8, wherein the first resource is a file system, the second resource is an application programming interface, and the third resource is a database.

13. The method of claim 8, further comprising:
receiving, by the processor, a second request message from the user device;
communicating, by the processor, a fifth request to the first resource;
determining, by the processor, that a response to the fifth request was not received from the first resource within the increased first timeout; and
communicating, by the processor, a second response message to the user device indicating that the fifth request timed out.

14. The method of claim 8, further comprising:
receiving, by the processor, a second request message from the user device;
communicating, by the processor, a fifth request to the second resource;
determining, by the processor, that a response to the fifth request was not received from the second resource according to the increased reconnect parameter; and
communicating, by the processor, a second response message to the user device indicating that fifth request failed.

15. A system comprising:
a user device;
a first resource;
a second resource;
a third resource; and
an error handling tool, comprising:
a memory comprising instructions; and
a hardware processor communicatively coupled to the memory, wherein the hardware processor, when executing the instructions, is configured to:
store a plurality of reprocessing rules;
receive a request message from the user device, the request message having a request timeout;
determine component requests of the request message comprising a first request, a second request, a third request, and a fourth request, wherein an assembly of responses to each component request form a response to the request message;
communicate the first request to the first resource;
receive a first response to the first request from the first resource;
communicate the second request to the first resource after receiving the first response, the second request having a first timeout that is shorter than the request timeout, wherein the first timeout is set by the user device, and the first request and the second request are communicated to the first resource in sequence;
communicate the third request to the second resource, the third request having a second timeout that is shorter than the request timeout and a reconnect parameter, wherein the reconnect parameter of the third request indicates a number of connection attempts to be made before the third request is considered a failure;
communicate the fourth request to the third resource, wherein the third request and the fourth request are communicated to the second resource and the third resource, respectively in parallel;
receive a second response to the fourth request from the third resource;
determine that a response to the second request was not received from the first resource within the first timeout;
in response to determining that the response to the second request was not received within the first timeout, increase, based on the plurality of reprocessing rules, the first timeout;
communicate the second request to the first resource after increasing the first timeout;
receive a third response to the second request from the first resource within the increased first timeout;
determine that a response to the third request was not received from the second resource within the second timeout;
in response to determining that the response to the third request was not received from the second resource within the second timeout, increase, based on the plurality of reprocessing rules, the reconnect parameter;
communicate the third request to the second resource after increasing the reconnect parameter;
receive a fourth response to the third request from the second resource within the second timeout after increasing the reconnect parameter;
generate a response message to the request message using the first response, the second response, the third response, and the fourth response; and
communicate the response message to the user device within the request timeout.

16. The system of claim 15, wherein the error handling tool communicates the third request to the second resource and the fourth request to the third resource before communicating the second request to the first resource.

17. The system of claim 15, wherein the error handling tool is further configured to adjust the plurality of reprocessing rules based on increasing the first timeout and the reconnect parameter.

18. The system of claim 15, wherein the error handling tool is further configured to:
place the second request in a reprocessing queue after determining that the response to the second request was not received from the first resource within the first timeout; and
place the third request in the reprocessing queue after determining that the response to the third request was not received from the second resource within the second timeout.

19. The system of claim 15, wherein the error handling tool is further configured to:
receive a second request message from the user device;
communicate a fifth request to the first resource;

determine that a response to the fifth request was not received from the first resource within the increased first timeout; and communicate a second response message to the user device indicating that the fifth request timed out.

20. The system of claim 15, wherein the error handling tool is further configured to:

receive a second request message from the user device;

communicate a fifth request to the second resource;

determine that a response to the fifth request was not received from the second resource according to the increased reconnect parameter; and communicate a second response message to the user device indicating that fifth request failed.

* * * * *